United States Patent Office 3,753,903
Patented Aug. 21, 1973

3,753,903
WELL COMPLETION AND WORKOVER FLUID
Paul W. Fischer, Whittier, and Julius P. Gallus, Anaheim, Calif., assignors to Union Oil Company of California, Los Angeles, Calif.
Field Apr. 28, 1971, Ser. No. 138,200
Int. Cl. C10m 3/12, 3/22
U.S. Cl. 252—8.5 A   11 Claims

ABSTRACT OF THE DISCLOSURE

A non-damaging well completion and workover fluid is disclosed. The fluid comprises a dispersion of finely divided solid wax particles and finely divided solid particles of a water-insoluble, acid-soluble inorganic material in an aqueous salt solution containing especially selected emulsifiers. The density of the fluid is controlled by varying the concentration of dissolved salts, and the viscosity can be increased by the addition of hydroxyethyl cellulose. A small amount of liquid hydrocarbon can be added to improve the fluid loss properties of the fluid.

---

Figure 1:
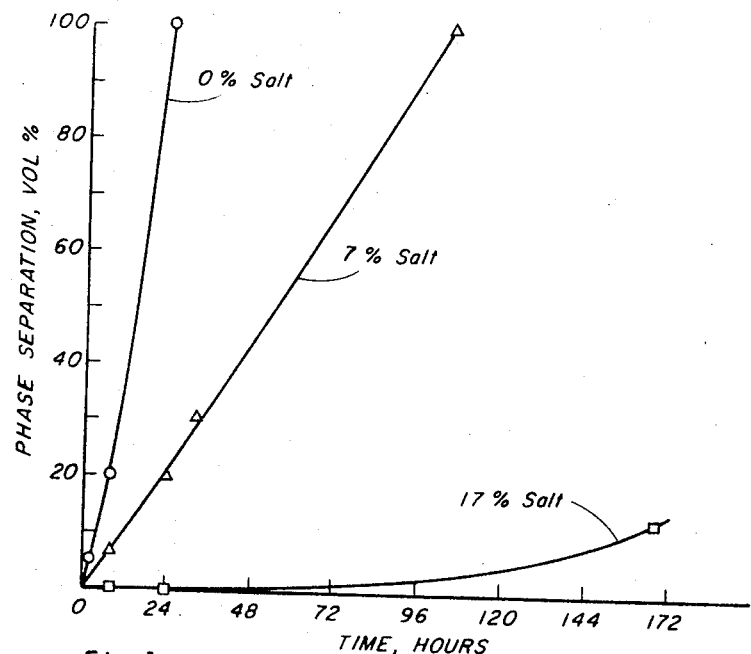

This invention relates to the drilling and servicing of wells, and more particularly to aqueous well completion and workover fluids for use in drilling wells into permeable fluid-producing formations and for servicing wells drilled into such formations.

In the rotary method of drilling wells into the earth for the recovery of fluids therefrom, such as oil and/or gas contained in underlying strata thereof, or for the injection of fluids such as flood water or gas into these strata, it is conventional practice to circulate a drilling fluid downwardly through the drill pipe, outwardly through apertures in a bit mounted at the end of the drill pipe, and upwardly through the annulus to the surface. The drilling fluid cools the bit, transports cuttings out of the bore hole, prevents sluffing or caving of the walls of the hole, and prevents well blowouts when drilling into strata containing fluids at elevated pressure. While a wide variety of drilling fluid compositions have been proposed, most of these fluids contain suspended clays or other solid matter that enter into the permeable strata or deposit on the exposed wall of the well resulting in a permanent reduction in the permeability of the formation rendering it less susceptible to fluid flow between the well and the formation or vice versa.

In a well completion operation, i.e., in the stage of the drilling operation wherein the bore hole is drilled into or through the fluid producing strata, it is desirable to employ a drilling fluid which does not impair the permeability or productivity of the petroleum producing strata penetrated by the bore hole. Similarly, in the placement of gravel packs in a well and in workover and other well servicing operations in which permeable oil-bearing strata are contacted by a workover fluid, it is desirable to employ a workover fluid that does not reduce the permeability of or otherwise damage the producing strata.

While clear water and various brines and viscous aqueous solutions have been proposed as well completion and workover fluids, these fluids generally do not possess the requisite properties of density, viscosity, gel strength, stability, and low fluid loss desired for these applications. Hence, need exists for a non-damaging well completion and workover fluid having the requisite properties for use in completing wells in permeable strata and in conducting workover and similar operations in such wells, but which will not result in any substantial permanent damage to the permeable strata which it contacts.

Accordingly, it is a principal object of this invention to provide an improved well completion and workover fluid.

Another object of the invention is to provide a water base completion or workover fluid that results in no substantial permanent reduction in the permeability of the porous strata which it contacts.

Still another object of this invention is to provide a substantially play-free well completion and workover fluid.

Yet another object of this invention is to provide a non-damaging well completion and workover fluid that exhibits the requisite properties of density, viscosity, gel strength and fluid loss.

A further object of the invention is to provide a water base completion and workover fluid that can be readily prepared at the well site.

Figure 2:
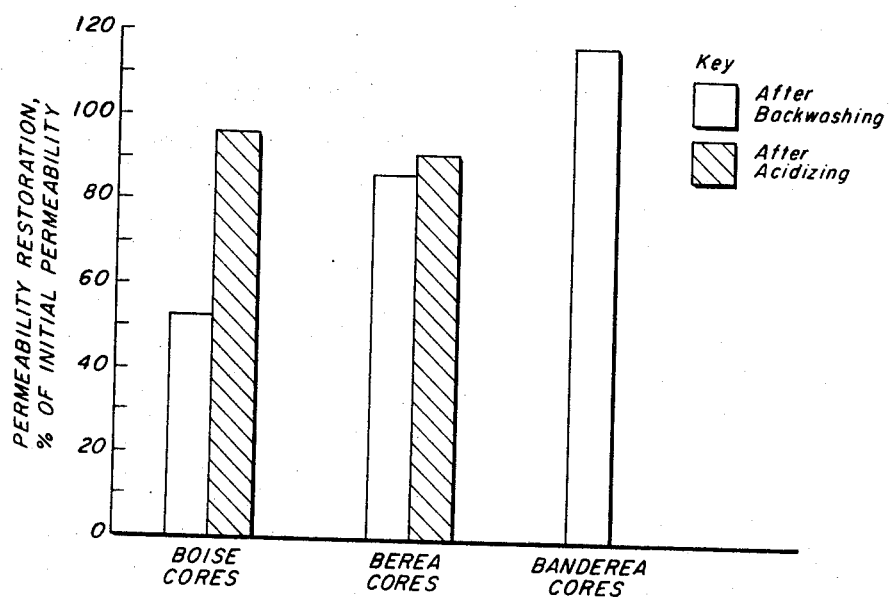

Other objects and advantages of the invention will be apparent from the following description and the accompanying drawings, in which:

FIG. 1 is a graph of phase separation as a function of time for fluid compositions of different salt contents as determined in Example 1; and FIG. 2 is a bar graph indicating the degree of permeability restoration for various types of cores as determined in Example 3.

Briefly, the well completion and workover fluids of this invention comprise dispersions of finely divided solid wax particles and finely divided solid particles of a water-insoluble, acid-soluble inorganic material in an aqueous salt solution containing especially selected emulsifiers. The density of the fluid is controlled by varying the concentration of dissolved salts, and the viscosity can be increased by the addition of hyroxyethyl cellulose. A small amount of liquid hydrocarbon can be added to improve the fluid loss properties of the fluid. The fluid is prepared and shipped to the point of use as a concentrate of the finely divided solid wax, the water-insoluble, acid-soluble particles and the emulsifiers in a small amount of water. The fluid is diluted by the addition of water and the other ingredients added at the well site.

Fluid compositions useful as completion and workover fluids must exhibit a number of desirable properties to facilitate their use in these applications. These properties are summarized as follows:

DENSITY (MUD WEIGHT)

It is important that the density of the drilling fluid be sufficiently high that the hydrostatic pressure of the fluid column in the well holds loosely consolidated caving formations in place and exceeds the formation pressures encountered. A test for measuring drilling fluid density is set forth in the publication entitled "Standard Procedure for Testing Drilling Fluids, Section 1, Density (Mud Weight)," API Recommended Practice, American Petroleum Institute, API RP 13 B, April 1969, pages 3–4.

VISCOSITY AND GEL STRENGTH

Viscosity is a measure of the internal resistance of a fluid to flow; higher viscosity indicating greater resistance. The viscosity of a drilling fluid affects several important functions, and means must be provided to control viscosity during various phases of an operation. For example, it is usually desired to employ low viscosity fluids to favorably affect the drilling rate, to improve mud circulation, and to promote the separation of cuttings from the drilling fluid. Yet, increased viscosity generally enhances the mud carrying capacity of the fluid, reduces fluid loss, and tends to promote conditioning of the formation to minimize caving and water damage to water-sensitive formations. Thus, in a drilling operation, the viscosity of the drilling fluid must be controlled to compromise these various functions. Also, it is desirable to specifically adjust the viscosity of the drilling fluid in certain operations such as running casing, logging and cementing.

Viscosity can be measured by a Fann motor-driven viscosimeter as described in "Standard Procedure for Testing Drilling Fluids, Section 2, Viscosity and Gel Strength," API Recommended Practice, ibid., pages 5 and 6. This apparatus is operated at speeds of 300 and 600 r.p.m., and has an attachment for determining gel strength. The apparent viscosity in centipoises equals the 600 r.p.m. reading divided by 2. The plastic viscosity in centipoises equals the 600 r.p.m. reading minus the 300 r.p.m. reading.

The gel strength of drilling fluids is a measure of the minimum shearing stress necessary to produce slip-wise movement. Gel strength affects the solids carrying capacity of the fluid. When a drilling fluid possesses finite gel strength, all cuttings up to a certain size and density will be removed from the hole no matter how low the upward velocity may be. The gel strength of the drilling fluid must be sufficient to prevent cuttings and other solids settling to the bottom of the hole, even during periods when mud circulation is temporarily stopped. In a similar manner, loose material in crevices and interstices will be secured and prevented from entering the hole. The optimum gel strength varies with the weight and viscosity of the fluid, and with the size cuttings or cavings entrained in the drilling fluid. While it is important that the drilling fluid remove all cuttings from the hole and hold them in suspension during interruptions in drilling, it is equally important that the consistency of the fluid allow the sand and cuttings to be removed in the cyclones and/or settling pits. These seemingly opposite functions may be achieved by careful control of viscosity and gel strength in conjunction with the use of proper separation equipment. Gel strength in pounds per 100 square feet is determined with the Fann motor-driven viscosimeter by use of a special attachment, and is usually measured immediately after stirring and after a 10-min. quiescent period. These are reported as the initial and 10-minute gel strengths.

The yield point is a measure of that part of flow resistance arising from attractive forces between the solid particles in the drilling fluid. Yield point in pounds per 100 square feet equals the 300 r.p.m. reading on the Fann motor-driven viscosimeter minus the plastic viscosity.

FLUID LOSS

The filtration property of drilling fluids is a measure of the ability of the solid components of the drilling fluid to form a thin, low-permeability filter cake. This property is dependent upon the amount and physical state of the solid material in the drilling fluid. It has been shown repeatedly in the field that when drilling fluid containing proper solids is used, a thin low-permeability cake is formed which minimizes difficulties. In contrast, a thick cake restricts the passage of tools and allows an excessive amount of filtrate to pass into the formation, thus increasing the possibility of formation damage. Lack of proper walling properties may result in further trouble such as difficulty in running casing, creating a swabbing effect which may cause the formation to heave or swab reservoir contents into the hole, and difficulty in securing a water shutoff because of channeling of cement. The filtration and wall building characteristics of a drilling fluid are determined by an API fluid loss test described in "Standard Procedure for Testing Drilling Fluids, Section 3, Filtration," API Recommended Practice, ibid., pages 8 and 9.

pH

The pH of a drilling fluid is an important characteristic and can be measured by the methods described in "Standard Procedure for Testing Drilling Fluids, Section 6, pH," API Recommended Practice, ibid., page 12.

STABILITY

The stability of an emulsion or dispersed phase drilling fluid is defined as the tendency of the dispersed phase to separate from the bulk fluid as a function of time. Drilling fluids should exhibit good stability to prevent separation of the disperse phase in the hole and in the mud pit. One method of determining the stability of a drilling fluid dispersion is to place a quantity of well mixed fluid in a transparent container and to determine the percent of separate phase formed under quiescent conditions as a function of time.

It is desired that well completion and workover fluids be substantially non-damaging to the permeable formations which they contact. By "substantially non-damaging" it is meant that upon a fluid contacting a permeable formation at elevated pressure, the permeability of the formation will not be less than 90 percent of its initial permeability, or the permeability can be restored to this value by a simple acid treatment. In addition to this non-damaging capability, the following summarize other desirable properties for fluids used in well completion and workover operations:

Density—controllable up to 120 lbs./cu. ft.
Apparent viscosity—controllable over the range of 3 to 25 cp.
Gel strength:
    initial—2 lbs./100 sq. ft. maximum
    10-minute—5 lbs./100 sq. ft. maximum
Fluid loss, API—10 ml./30 minutes maximum
Stability—less than 25% separation in 24 hours.

We have discovered a fluid composition that exhibits the requisite properties and that constitutes a highly desirable workover and completion fluids. This composition comprises a dispersion of about 4 to 10 pounds per barrel of finely divided solid wax particles, about 5 to 30 pounds per barrel of finely divided solid particles of a water-insoluble, acid-soluble inorganic material, about 3 to 10 pounds per barrel of an emulsifier consisting essentially of an oil-soluble polyhydric alcohol anhydride partial higher fatty acid ester and a water-soluble polyoxyethylene derivative of partial esters of hexitol anhydride and long chain fatty acid in an aqueous salt solution containing at least about 5 weight percent dissolved salts. The term "barrel" used herein refers to a liquid volumetric measure containing 42 gallons used extensively in the petroleum industry.

Any of a wide variety of waxes can be employed in the composition of this invention. Suitable waxes include crystalline and microcrystalline petroleum waxes as well as beeswax, carnauba wax, condellila wax, montan wax, and the like. One preferred class of waxes are fully and partially refined paraffin waxes melting between about 125° F. and 170° F. Another class of waxes and wax-like substances that can be employed, particularly in higher temperature applications, are long chain aliphatic hydrocarbon and oxidized hydrocarbon waxes melting above about 170° F., such as the synthetic Fischer-Tropsch waxes. These waxes are characteristically straight or branched chain aliphatic hydrocarbons and oxygenated aliphatic hydrocarbon compounds such as aliphatic carboxylic acids and esters having molecular weights higher than the paraffin waxes, and particularly having molecular weights of about 500 to 2500. A preferred class of synthetic waxes are long chain aliphatic hydrocarbon and oxidized hydrocarbon waxes melting between about 195° F. and 250° F.

The waxes incorporated into the compositions of this invention are selected for their melting points and oil solubility. The selected wax must exhibit a melting point above the maximum temperature to which it will be subjected, and preferably at least about 10° F. above this temperature. Also, the wax should be at least slowly soluble in oil so that it will not permanently damage oil-bearing strata of the formation, and if necessary, can be removed by swabbing the well with oil.

The waxes useful in the drilling and completion fluids of this invention can be blends of one or more of the aforementioned waxes, and can also include a polymer component to improve the properties of the wax, such as its strength and melting point. The polymers that can be incorporated into the wax include (1) addition polymers of an olefin having between two and four carbon atoms in the monomer molecule, such as polyethylene, polypropylene and polybutylene; (2) copolymers of an olefin having between two and four carbon atoms and an alkyl acrylate containing not more than four carbon atoms in the alkyl group, such as esters formed by the reaction of acrylic acid and an alcohol having no more than four carbon atoms; (3) copolymers of an olefin having between two and four carbon atoms and esters formed by the reaction of butenic acid and an alcohol having no more than four carbon atoms; and (4) copolymers of an olefin having between two and four carbon atoms and an ester formed by the reaction of acetic acid and an unsaturated alcohol having no more than four carbon atoms. Preferred polymer component materials include polyethylene, polypropylene, polybutylene, copolymers of ethylene and vinyl acetate, copolymers of ethylene and ethyl acrylate, and copolymers of ethylene and methyl methacrylate. These polymers are typically added to the wax to provide wax-polymer blends containing less than about 20 weight percent polymer, and preferably between about 5 and 15 weight percent polymer.

The solid wax particles dispersed in the fluid composition are finely divided in that the bulk of the particles have average diameters of less than 100 microns, and preferably within the range of about 1 to 50 microns. Wax dispersions exhibiting superior fluid loss and stability characteristics are obtained by a dispersion technique that is hereinafter more fully described.

The finely divided, solid, water-insoluble, acid-soluble inorganic material dispersed in the aqueous solution enhances the fluid loss and stability characteristics of the fluid and promotes the formation and dispersion of the finely divided wax particles. It is preferred that the bulk of these particles have average diameters of less than about 10 microns, and preferably less than about 1 micron. Any water-insoluble inorganic material that is reactive with hydrochloric acid and which does not form insoluble precipitates can be utilized. Preferred materials include alkaline earth metal carbonates, and particularly calcium and magnesium carbonates.

The dissolved salts prevent or inhibit hydration of the water-sensitive components of the formation and promote stability of the fluid composition. The effect of salt content upon dispersion stability is illustrated in FIG. 1, which shows that phase separation is decreased at higher salt contents. The fluid composition contains at least about 5 weight percent dissolved salts to provide a stability of not more than 25 percent separation in 24 hours, which is deemed the minimum acceptable value in many applications. Also, the density (mud weight) can be increased by the addition of dissolved salts, the maximum density being limited by the solubility of the salts. The concentration of salts must be maintained below the saturation concentration at the temperatures to which the fluid will be subjected to prevent salting out, i.e., solids precipitation. While the maximum mud weight is dependent upon the particular salt or salts dissolved in the fluid and the temperature, mud weight can generally be increased from the minimum of about 65 pounds per cubic foot up to about 100 pounds per cubic foot by the control of salt concentration.

Inorganic salts which can be dissolved in the fluid include alkali metal, alkaline earth metal and ammonium halides and nitrates. The preferred salts include sodium, potassium, calcium and ammonium halides, and particularly sodium chloride, potassium chloride, calcium chloride and ammonium chloride. Either a single salt may be dissolved in the fluid, or a mixture of salts may be employed. The preferred salt concentration range to provide a stability of not more than 25 percent separation in 24 hours depends upon the particular salt employed. The preferred concentration ranges for various salts are listed in Table 1.

TABLE 1.—PREFERRED CONCENTRATION RANGES FOR VARIOUS SALTS

| Salt: | Concentration range, wt. percent |
|---|---|
| Sodium chloride | 5–10 |
| Ammonium chloride | 5–20 |
| Potassium chloride | 5–22 |
| Calcium chloride | 5–40 |
| Sodium nitrate | 5–20 |
| Ammonium nitrate | 5–40 |
| Potassium nitrate | 5–30 |
| Calcium nitrate | 5–50 |

It has been found that the choice of emulsifier is extremely critical, both with regard to the formation of the wax dispersion and to the stability of the ultimate fluid. The emulsifiers that both promote the formation of the finely divided wax particles and render the fluid composition stable are admixtures of an oil-soluble polyhydric alcohol anhydride partial higher fatty acid ester and a water-soluble polyoxyethylene derivative of partial esters of hexitol anhydride and long chain fatty acids, of which the sorbitan partial higher fatty acid esters and polyoxyethylene derivatives of partial esters of sorbitan and long chain fatty acids are preferred. Useful oil-soluble emulsifiers include sorbitan monolaurate, sorbitan monopalmitate, sorbitan monostearate, sorbitan monooleate and sorbitan trioleate. Useful water-soluble emulsifiers include polyoxyethylene derivatives of these agents. A particularly preferred emulsifier system is an admixture of sorbitan monosterate and a polyoxyethylene derivative of sorbitan monostearate.

Wax particle formation and stability is also dependent upon the concentration of the emulsifier and the relative proportion of the oil-soluble and water-soluble agent. The emulsifiers are employed in a concentration that provides about 0.3 to 2.5 parts by weight emulsifier per part of wax, and more preferably about 0.7 to 1 part by weight of emulsifier per part of wax. A most preferred emulsifier concentration is about 0.83 part by weight of emulsifier per part of wax. The emulsifiers are employed in the proportion of about 0.5 to 2.5 parts by weight oil-soluble emulsifier per part of water-soluble emulsifier, and more preferably in the proportion of about 1.0 to 2.0 parts by weight oil-soluble agent per part of water-soluble agent. A particularly preferred emulsifier system is an admixture of about 1.5 parts by weight of sorbitan monostearate per part of a polyoxyethylene derivative of sorbitan monostearate.

A minor amount of liquid hydrocarbon can be added to the fluid composition to improve its fluid loss characteristic. Highly volatile hydrocarbons are not preferred as they will be vaporized and lost from the circulating fluid and can form explosive mixtures in the presence of air. The preferred liquid hydrocarbons are relatively high-flash, distillate petroleum products, such as distillate hydrocarbon liquids having flash points above about 125° F. The preferred distillate hydrocarbon liquids include stove oil, diesel, kerosene, light gas oil, and the like. Kerosene is a particularly preferred additive material. The liquid hydrocarbon is incorporated into the fluid composition of this invention in the amount of up to about 5 pounds per barrel, and preferably in the amount of about 0.5 to 2.0 pounds per barrel.

In many applications it is desired to maintain the viscosity of the fluid as low as possible to promote higher drilling rates and to facilitate separation of cuttings from the fluid returns. However, in certain operations, e.g., in running casing, logging, or to control caving conditions, it is desirable to increase the viscosity of the fluid. Suitable viscosity control can be achieved by adding high molecular weight hydroxyethyl cellulose to the fluid composition. Hydroxyethyl cellulose is compatible with the fluid and does not flocculate or separate from the fluid on centrifuging. A hydroxyethyl cellulose useful in viscosity control of the fluid composition of this invention is marketed by Hercules Powder Company under the trademark Natrosol 250 HR. The apparent viscosity of the fluid without added thickening agent is about 3 to 5 centipoises. This viscosity can be increased to about 25 centipoises by the addition of up to 1.5 pounds per barrel of hydroxyethyl cellulose. Also, the addition of hydroxyethyl cellulose beneficially affects fluid loss and gel strength. Thus, in many applications, it is preferred to incorporate up to about 1.0 pound per barrel, and more preferably about 0.5 pound per barrel of hydroxyethyl cellulose in the fluid to be used in general purpose applications, additional thickener being required to increase the viscosity for special proper uses. However, utmost care must be taken to avoid an excess increase in thixotropy in order to maintain a substantially clay-free fluid. Clay separation is adequate in most cases with a fluid containing about 0.5 pound per barrel of hydroxyethyl cellulose.

A preferred stabilized aqueous dispersion useful as a well completion and workover fluid is comprised of about 4 to 10 pounds of finely divided solid wax particles, about 5 to 30 pounds of finely divided calcium carbonate, about 1.5 to 6 pounds of an oil-soluble polyhydric alcohol anhydride partial higher fatty acid ester emulsifying agent, about 1.5 to 4 pounds of a water-soluble polyoxyethylene derivative of partial esters of hexitol anhydride and long chain fatty acid emulsifying agent, at least about 17 pounds of a water-soluble salt, about 0.5 to 2 pounds of liquid hydrocarbon, up to about 1.5 pounds of hydroxyethyl cellulose, all per barrel of fluid composition, sodium hydroxide in an amount to adjust the pH to a value between about 7.5 and 9.5, and water to make one barrel.

A particularly preferred composition is comprised of about 5 pounds of finely divided solid wax particles, about 6 pounds of finely divided calcium carbonate, about 3 pounds of sorbitan monostearate, about 2 pounds of polyoxyethylene derivative of sorbitan monostearate, at least about 17 pounds of sodium potassium, calcium, or ammonium halide, and preferably sodium, potassium, calcium or ammonium chloride, about 1 pound of kerosene, about 0.5 pounds of hydroxyethyl cellulose, sodium hydroxide in an amount to adjust the pH to a value between about 8 and 9, and water to make one barrel. This particularly preferred composition exhibits the following properties:

| | |
|---|---|
| Fluid Loss, API, ml./30 min. | 4.0–4.5 |
| Viscosity, apparent, cp. | 13.5 |
| Gel strength, lbs./100 sq. ft., initial | 0.6 |
| Gel strength, lbs./100 sq. ft., 10-min. | 0.7 |
| Density, lbs./cu. ft. | 66 |
| Stability, percent separation in 24 hours | <20 |

The well completion and workover fluids of this invention are preferably prepared as concentrates of finely divided solid wax particles, finely divided solid particles of a water-insoluble, acid-soluble inorganic material, and emulsifiers dispersed in water. These concentrates can be prepared and shipped to the well site, whereupon the drilling and workover fluid is prepared by diluting the concentrate with water and adding the other agents. Mixing can be accomplished in the mud pit by circulation with the mud pumps in conventional manner.

Preferably, the concentrates are dispersions of about 4 to 10 parts by weight of finely divided solid wax particles, about 5 to 30 parts by weight of finely divided solid particles of a water-insoluble, acid-soluble inorganic material, about 3 to 10 parts by weight emulsifier, and about 12 to 50 parts by weight of water. A particularly preferred concentrate is comprised of about 6 parts by weight finely divided wax particles, about 10 parts by weight finely divided calcium carbonate, about 3 parts by weight sorbitan monostearate, about 2 parts by weight polyoxyethylene derivative of sorbitan monostearate, and about 16 parts by weight water.

The concentrate is prepared by combining suitable quantities of bulk-form wax, the finely divided water-insoluble, acid-soluble material, the emulsifiers, and the water. This admixture is heated to a temperature above the melting point of the wax and severely agitated to disperse the molten wax and solids. Agitation is continued while cooling the fluid to solidify the wax. The resulting product is a dispersion of finely divided solid wax particles of the desired size range and finely divided solid water-insoluble, acid-soluble particles in water.

The invention is further described by the following examples which are illustrative of specific modes of practicing the invention and are not intended as limiting the scope of the invention as defined by the appended claims.

Example 1

This example illustrates the criticality of salt content with regard to dispersion stability. In this series of tests, three fluid compositoins are prepared substantially in accordance with the preferred embodiment of this invention, excepting that the dissolved salt content is varied. One composition is prepared with no added salts, one is prepared with about 7 weight percent dissolved potassium chloride, and one is prepared with about 17 weight percent dissolved potassium chloride.

The compositions are well mixed and placed in separate pint bottles, each bottle being filled to a depth of 3¾ inches. The contents of the bottles are allowed to stand under quiescent conditions and the amount of separate phase formed at either the top or bottom of the dispersion is measured at various times. These results are reported in Table 2 and graphically illustrated in FIG. 1. The volume percent phase separation is determined as the combined volume of separate phase formed at both the top and bottom as a percentage of the total volume of fluid in the sample. Since the bottles have substantially uniform cross-sections, fluid volumes can be determined by the measurement of the depth of the various phases.

In the composition containing no added salt, separation into a clear liquid top phase and a solid bottom phase is complete within 24 hours. With the composition containing 7 percent added salt, separation is only 20 percent after 24 hours, and 96 hours is required for complete separation. No separation of the composition containing 17 percent added salt is observed in 24 hours, and only about 13 percent separation is observed after standing quiescent for 168 hours.

TABLE 2.—DISPERSION STABILITY

| Time, hours | Top phase, inches | Bottom phase, inches | Combined separate phase, inches | Phase separation, vol. percent |
|---|---|---|---|---|
| 0% salt added | | | | |
| 0 | 0 | 0 | 0 | 0 |
| 3 | 0 | ³⁄₁₆ | ³⁄₁₆ | 5 |
| 8 | 0 | ¾ | ¾ | 20 |
| 24 | 2½ | 1¼ | 3¾ | 100 |
| 7% salt added | | | | |
| 0 | 0 | 0 | 0 | 0 |
| 8 | ¼ | 0 | ¼ | 6.7 |
| 24 | ¾ | 0 | ¾ | 20 |
| 32 | 1⅛ | 0 | 1⅛ | 30 |
| 96 | 2¾ | 1 | 3¾ | 100 |
| 17% salt added | | | | |
| 0 | 0 | 0 | 0 | 0 |
| 8 | 0 | 0 | 0 | 0 |
| 24 | 0 | 0 | 0 | 0 |
| 168 | ½ | 0 | ½ | 13.3 |

Example 2

This example illustrates the stability of the fluid composition upon being processed through a cyclone separator. A well treating and workover fluid having the following composition is prepared by the technique of this invention:

| | Pounds/barrel |
|---|---|
| 165° F. MP paraffin wax | 6.0 |
| Sorbitan monostearate | 3.0 |
| Polyoxyethylene derivative of sorbitan monostearate | 2.0 |
| 1 micron calcium carbonate | 10.0 |
| Potassium chloride | 24.5 |
| Kerosene | 1.0 |
| Hydroxyethyl cellulose | 1.0 |
| Caustic | Trace |
| Water to make one barrel. | |

A quantity of the fluid is mixed in a mud drum and passed through a cyclone separator. The fluid entering the cyclone and the overflow and underflow streams from the cyclone are sampled and tested. The results of these tests are reported in Table 3.

TABLE 3

| | Cyclone | | |
|---|---|---|---|
| | Feed | Overflow | Underflow |
| Fann viscosimeter reading at— | | | |
| 600 r.p.m | 23.0 | 22.6 | 22.3 |
| 300 r.p.m | 14.2 | 14.1 | 13.6 |
| Apparent viscosity, cp | 11.5 | 11.3 | 11.2 |
| Plastic viscosity, cp | 8.8 | 8.5 | 8.7 |
| Yield point, lb./100 sq. ft | 5.4 | 5.6 | 4.9 |
| Gel strength, lb./100 sq. ft., initial | 0.2 | 0.2 | 0.3 |
| 10-minute | 0.3 | 0.2 | 0.2 |
| API fluid loss, ml./30 min | 4.2 | 4.5 | 3.7 |
| Mud weight, lbs./cu. ft | 64.5 | 65.0 | 65.0 |
| pH | 7.7 | 7.8 | 7.7 |

No substantial separation of the various components of the fluid is observed in processing the fluid through the cyclone, nor do the tests of the feed and effluents from the cyclone indicate any substantial difference in properties. Accordingly, this example demonstrates that this fluid can be subjected to processing through a cyclone separator without any material effect on fluid properties.

Example 3

This example illustrates that the fluid compositions of this invention are substantially non-damaging to permeable formations which they contact. In conducting this test, a well completion and workover fluid having the following composition is prepared by the technique of this invention:

| | Pounds/barrel |
|---|---|
| 165° F. MP paraffin wax | 6.0 |
| Sorbitan monostearate | 3.0 |
| Polyoxyethylene derivative of sorbitan monostearate | 2.0 |
| 1 micron calcium carbonate | 10.0 |
| Potassium chloride | 73.5 |
| Kerosene | 1.0 |
| Hydroxyethyl cellulose | 1.0 |
| Caustic | Trace |
| Water to make one barrel. | |

Permeability reduction tests are run in duplicate on Boise, Berea and Banderea cores. Two of each type of cores are saturated with 3 percent sodium chloride solution, and thereafter kerosene is flowed through the cores at 30 p.s.i.g. and 125° F. to establish the original permeabilities. The fluid composition is then flowed across the face of each of the cores at 500 p.s.i.g. and 125° F. for 20 hours. Next, the cores are back flowed with kerosene at 30 p.s.i.g. and 125° F. until stable flows are obtained. Those cores which do not show a return to substantially the original permeability are acidized by backflowing 25 mls. of 15 percent hydrochloric acid. Kerosene is again backflowed through the core at 30 p.s.i.g. and 125° F. until stable flows are obtained to establish their permeability after acidizing. The results of this test are reported in Table 4 and the average value of permeability restoration for each type of core plotted in FIG. 2.

TABLE 4

| | Boise No. 1 | Cores No. 2 | Berea No. 1 | Cores No. 2 | Bandera No. 1 | Cores No. 2 |
|---|---|---|---|---|---|---|
| Kerosene flow rate, ml./min.: | | | | | | |
| Initial | 70.0 | 62.0 | 5.5 | 5.0 | 0.6 | 0.5 |
| After backwashing | 40.0 | 30.0 | 4.4 | 4.7 | 0.7 | 0.6 |
| After acidizing | 68.0 | 60.0 | 4.8 | 4.7 | | |
| Permeability restoration, percent: | | | | | | |
| After backwashing | 57 | 49 | 80 | 94 | 117 | 120 |
| After acidizing | 97 | 97 | 87 | 94 | | |

From the foregoing, it is apparent that the permeability of the cores can be substantially completely restored to their original value by backwashing or by treatment with hydrochloric acid.

Various embodiments and modifications to this invention have been described in the foregoing description and examples, and further modifications are included within the scope of this invention as defined by the following claims.

Having now described the invention, I claim:

1. An aqueous well completion and workover fluid comprising a dispersion of about 4 to 10 pounds per barrel of finely divided solid hydrocarbon or oxidized hydrocarbon wax particles having average diameters of less than 100 microns; about 5 to 30 pounds per barrel of finely divided solid particles of an alkaline earth metal carbonate having average particle diameters of less than about 10 microns; about 3 to 10 pounds per barrel of an emulsifier consisting essentially of an oil-soluble sorbitan partial higher fatty acid ester and a water soluble polyoxyethylene sorbitan partial higher fatty acid ester. in an aqueous salt solution containing at least about 5 weight percent of dissolved alkali metal, alkaline earth metal or ammonium halide salts.

2. The composition defined in claim 1 wherein said oil-soluble and said water-soluble emulsifying agents are in the proportion of about 0.5 to 2.5 parts by weight of oil-soluble agent per part of water-soluble agent.

3. The composition defined in claim 1 wherein said dissolved salts are sodium, potassium or calcium halides.

4. The composition defined in claim 1 including up to about 5 pounds per barrel of a liquid hydrocarbon.

5. The composition defined in claim 1 including up to about 1.5 pounds per barrel of hydroxyethyl cellulose.

6. The composition defined in claim 1 having a pH between about 7.5 and 9.5.

7. The composition defined in claim 1 wherein said wax particles are a blend of a polymeric material and paraffin wax, said polymeric material being selected from the group consisting of (1) addition polymers of an olefin having between two and four carbon atoms, (2) copolymers of an olefin having between two and four carbon atoms and an alkyl acrylate containing not more than four carbon atoms in the alkyl group, (3) copolymers of an olefin having between two and four carbon atoms and an ester formed by the reaction of butenic acid and an alcohol having no more than four carbon atoms, and (4) copolymers of an olefin having between two and four carbon atoms and an ester formed by the reaction of acetic acid and an unsaturated alcohol having no more than four carbon atoms.

8. An aqueous well completion and workover fluid comprising an aqueous dispersion of about 4 to 10 pounds of finely divided solid particles of hydrocarbon or oxidized hydrocarbon wax having average diameters between about 1 and 50 microns; about 5 to 30 pounds of finely divided solid particles of alkaline earth metal carbonate having an average particle diameter of less than about 10 microns; about 1.5 to 6 pounds of an oil-soluble sorbitan partial higher fatty acid ester emulsifying agent; about 1.5 to 4 pounds of water-soluble polyoxyethylene sorbitan partial higher fatty acid ester emulsifying agent; at least about 17 pounds of water-soluble alkali metal, alkaline earth metal or ammonium halide salt; about 0.5 to 2 pounds of liquid hydrocarbon; up to about 1.5 pounds of hydroxyethyl cellulose; and sodium hydroxide to adjust the pH to a value between about 7.5 and 9.5, all per barrel of fluid.

9. The composition defined in claim 8 wherein said oil-soluble emulsifier is selected from the group consisting of sorbitan monolaurate, sorbitan monopalmitate, sorbitan monostearate, sorbitan monooleate and sorbitan trioleate, and wherein the water-soluble emulsifier is a polyoxyethylene ether of said oil soluble emulsifier.

10. An aqueous well completion and workover fluid comprising an aqueous dispersion of about 4 to 10 pounds of finely divided solid particles of hydrocarbon or oxidized hydrocarbon wax having average diameters between about 1 to 50 microns; about 5 to 30 pounds of finely divided solid particles of calcium carbonate having average particle diameters of less than about 10 microns; about 3 to 10 pounds of an emulsifier comprised of an admixture of sorbitan monostearate and polyoxyethylene sorbitan monostearate in the proportion of about 1.0 to 2.0 parts by weight of sorbitan monostearate per part of polyoxyethylene sorbitan monostearate; at least about 17 pounds of a water-soluble salt selected from the group consisting of sodium, potassium, calcium and ammonium halides; about 0.5 to 2 pounds of a liquid hydrocarbon having a flash point above about 125° F.; up to about 1.5 pounds of hydroxyethyl cellulose; and sodium hydroxide to adjust the pH to a value between about 7.5 and 9.5, all per barrel of fluid.

11. An aqueous well completion and workover fluid comprising an aqueous dispersion of about 5 pounds of finely divided solid particles of paraffin wax having average diameters between about 1 and 50 microns; about 6 pounds of finely divided solid particles of calcium carbonate having average diameters of about 1 micron; about 3 pounds of sorbitan monostearate; about 2 pounds of polyoxyethylene sorbitan monostearate; at least about 17 pounds of sodium, potassium, calcium or ammonium chloride; about 1 pound of kerosene; about 0.5 pound of hydroxyethyl cellulose; all per barrel of fluid, and sodium hydroxide to adjust the pH to a value between about 8 and 9.

References Cited
UNITED STATES PATENTS

| | | | |
|---|---|---|---|
| 3,455,390 | 7/1969 | Gallus | 252—8.55 X |
| 2,684,948 | 7/1954 | Cross | 252—311.5 |
| 3,281,354 | 10/1966 | Scott et al. | 252—8.55 |
| 3,525,397 | 8/1970 | Darley | 166—283 |
| 2,570,947 | 10/1951 | Himel et al. | 252—8.5 |
| 3,007,865 | 11/1961 | Priest | 252—8.55 |
| 3,408,296 | 10/1968 | Kuhn et al. | 252—8.55 |
| 3,373,106 | 3/1968 | Lister et al. | 252—8.5 |
| 3,601,194 | 8/1971 | Gallus | 166—283 |

HERBERT B. GUYNN, Primary Examiner

U.S. Cl. X.R.

166—283, 308; 252—8.5 C, 8.5 P, 8.55 R, 311.5